Nov. 12, 1935.  M. CABRERA Y GARCIA  2,020,884
DEVICE FOR DISTRIBUTING DRINKS
Filed Dec. 10, 1934  2 Sheets-Sheet 1
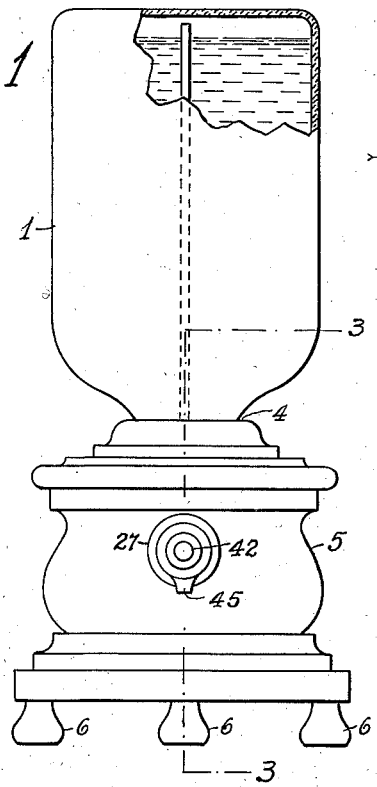
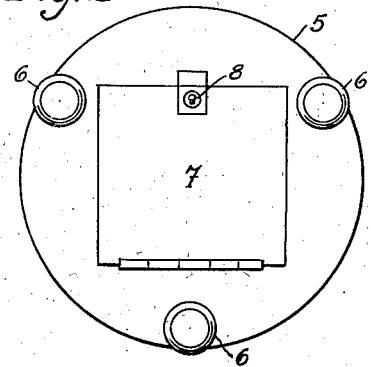
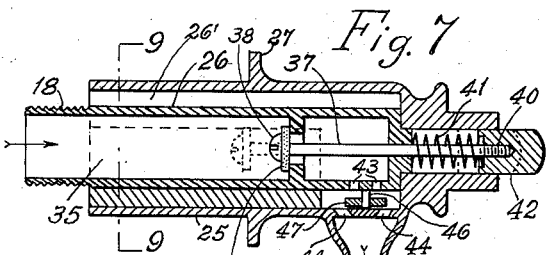
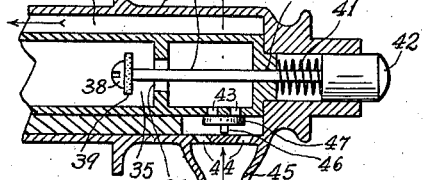
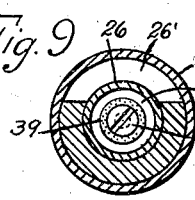
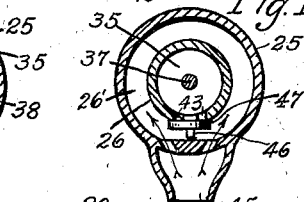
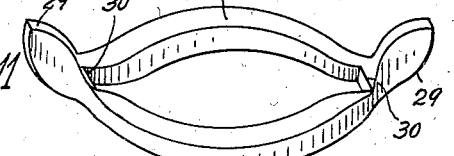
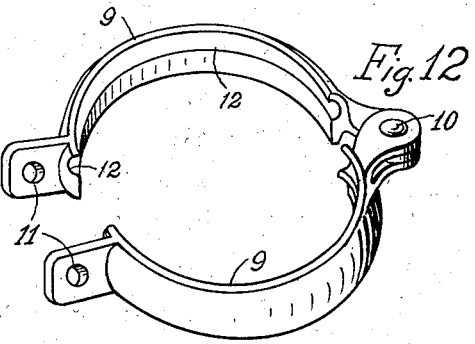

Nov. 12, 1935.   M. CABRERA Y GARCIA   2,020,884
DEVICE FOR DISTRIBUTING DRINKS
Filed Dec. 10, 1934   2 Sheets-Sheet 2
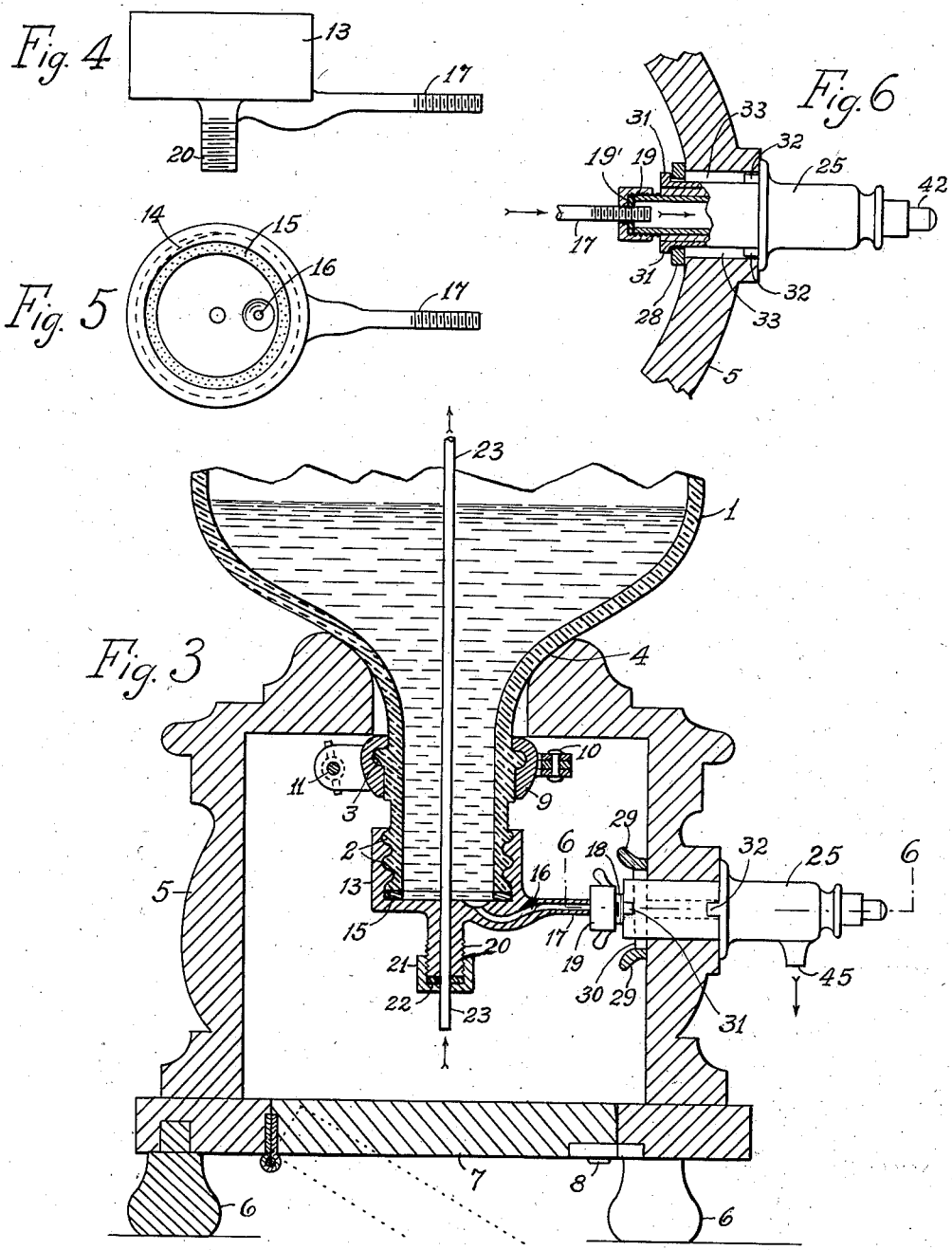
M. Cabrera y Garcia
INVENTOR
By: Marks & Clerk
Attys.

Patented Nov. 12, 1935

2,020,884

UNITED STATES PATENT OFFICE 2,020,884

DEVICE FOR DISTRIBUTING DRINKS

Manuel Cabrera y Garcia, Habana, Cuba

Application December 10, 1934, Serial No. 756,898

4 Claims. (Cl. 225—22)

This invention relates to a system and device for preventing fraud in the retail sale of drinks of all kinds, such as wines, liquors, brandy, rum, cognac, water, milk, etc., which drinks are served to the public in individual portions; and its object is to guarantee the consumer the genuineness of the product asked for, by means of the device which will be hereinafter described and claimed, which device prevents the dealer from refilling the original container of such drinks.

As it is known, the manufacturers, merchants or distributors of drinks are exposed to the unfair competition of unscrupulous retail dealers who refill with similar drinks the original containers, and this practice results not only in fraud to the public but also in a reduction in the sales of the genuine product, and what is worse, the discredit of this genuine product, since for obvious reasons the substituted drink will always be of inferior quality.

With the aim in view of preventing this fraudulent practice of the retail dealers is directed the present invention which substantially consists in delivering the drinks to the retail dealers in locked containers provided with means permitting the dealer to freely dispense or distribute the contents but preventing him from refilling the container.

The invention is capable of being performed by means of different devices, and as an example of one of them is the one illustrated in the accompanying drawings, in which:

Fig. 1 is a front elevation view of the receptacle placed in upside position on the base or casing, this position being the normal discharging position of the device.

Fig. 2 is a plan view of the bottom of the base or casing showing the locked door which communicates with the interior.

Fig. 3 is a fragmentary vertical section of the receptacle and casing on line 3—3 of Fig. 1, showing in dotted lines the position or direction in which the door opens.

Fig. 4 is a side view of the cap which is screwed to the neck of the receptacle; and Fig. 5 is a horizontal view of the same cap.

Fig. 6 is a section showing the adjustment of the faucet to a side of the base or casing.

Fig. 7 is a longitudinal section of the faucet on line 3—3 of Fig. 1, showing the valve in closed position, the dotted lines indicating the position when the valve is opened.

Fig. 8 is a similar view showing the position of the valve when attempt is made to refill the container through the outlet of the faucet.

Fig. 9 is a detail section of the valve on line 9—9 of Fig. 7; and Fig. 10 is a similar view on line 10—10 of Fig. 8.

Fig. 11 is a perspective view of the ring for securing the faucet to the side wall of the base or casing; and Fig. 12 is a perspective view of the piece for locking the receptacle inside the casing.

The device comprises a receptacle which may consist in a big glass bottle 1 provided with a threaded neck 2 and a rim or flange 3, which receptacle is placed upside down through the circular opening 4 of a base or casing 5 which may be of wood or any other suitable material, provided with three legs 6, and which base constitutes a casing having a chamber closed by a hinged door 7 provided with a lock 8. The discharge portion of the bottle is locked in position inside this casing by means of a locking piece formed by two semicircular sections 9, Fig. 12, connected to each other at one end by a pivot 10, forming a divided ring whose free end is locked by means of the screw and nut inserted through the eyes 11, which locking piece encircles the flange 3 of the bottle which fits in the channel 12 of the semicircular sections and thus maintains firmly secured the bottle against the upper side of the base or casing 5, and in this manner it will not be possible to take out the bottle from the casing without unlocking the semicircular sections 9. A cap 13 having a threaded inner flange 14 is tightly screwed by the aid of a rubber washer 15 to the threaded neck 2, this cap being provided with a discharge opening 16 extending out to a duct 17 which is connected to the inlet of a faucet by means of the winged nut 19 which is threaded on the exterior threaded end 18 of the faucet. This connection is tightly sealed by means of a rubber washer 19'. The cap or cover 13 is provided at its center with an opening terminating on its underside in a threaded stem 20 to which is threaded a sleeve 21 provided with rubber packing 22 for holding in position a glass breathing tube 23, inserted through the stem 20, one end of the glass tube being located inside the bottle above the liquid level and the opposite end at the exterior therefore beyond stem 20, thus permitting the necessary draft for discharging the contents of the bottle. The faucet comprises a cylindrical outer jacket 25 and an inner tube 26, one portion of this faucet being located outside the casing and the other portion, limited by the flange 27 which is adjusted against the exterior of the side wall of the casing, is inserted inside the casing through an adjustable opening in the side wall thereof, and by means of a metal ring 28 provided with oppositely arranged lugs 29 and cuts 30 which are inserted in corresponding lugs 31 provided at the end of jacket 25 and tightening said ring 28 by turning same so as to place the ring pressed by the lugs 31 the faucet will be firmly secured to the inner side wall of the casing, and by means of lugs 32 adjusted in the cuts 33 of the side wall the separation is prevented of the faucet from the casing by loosening same from the outside.

The valve for discharging the liquid comprises a valve seat 34, see Figs. 7 and 8 at the end of a conduit 35 and a reduced duct 36 through which is inserted a pin 37 having a screw head 38 and rubber washer 39 at the end of duct 35, which pin terminates in a threaded end 40 extended beyond the end of the reduced duct 36 where is disposed a helical spring 41 through which passes the pin whose end is screwed in the threaded bore of a plug 42 inserted at the open end of jacket 25 which plug acts as a press button for opening the valve seat 34.

Near the lower end of the reduced duct 36 are provided the outlets or discharge openings 43 which communicate with the openings 44 of jacket 25 terminated in the conical outlet 45. Between discharge openings 43 projects downwards a vertical pin 46 on which is loosely mounted a disc 47 which will act as an automatic valve for preventing the refilling of the receptacle as will be hereinafter explained.

Figs. 1 and 3 show the device in its normal position ready for discharging the contents of the receptacle. When the same is empty the dealer returns it to the distributor who keeps the key which locks the door 7. By inverting the position of the device, the door is opened and the base or casing is separated from the bottle, to which effect it is unscrewed the winged nut 18 and the cap 13 and finally the semicircular sections 9 are opened, thus releasing the mouth and neck of the bottle. Then the bottle is refilled and connected again to the casing in an obvious manner.

As is evident, it will not be possible to refill the bottle unless the door 7 is unlocked, and since the distributor keeps the key for this door, the retail dealer will be prevented from refilling the recipient; and should he intend to do so by trying to introduce the liquid through the outlet 45, this will be prevented by the disc or valve 47 which upon receiving the slightest exterior pressure will close the openings 43 assuming the position indicated in Figs. 8 and 10, and directing the introduced liquid to the exterior through the hollow space 26' as indicated by the arrows in said figures.

It will neither be possible to take out the faucet from the outside, since the lugs 32 inserted in the cuts 33 of the casing will prevent any movement for releasing the locking piece 28.

I claim:

1. A device for guaranteeing the genuineness of a drink contained in a receptacle comprising a casing closed by a locked door, an opening in said casing through which is inserted the discharge end of the receptacle, a flange on the neck of the receptacle to which is adjusted a detachable collar which is larger than the opening through which the receptacle neck is inserted, a cap threaded to the mouth of the receptacle provided with a central opening through which is inserted a breathing tube into the receptacle, a discharge opening in this cap leading to a duct connected to an inlet of a faucet located inside the casing, the outlet of the faucet being located outside the casing through an opening in the side wall of the casing, means for securing the faucet to this side wall preventing its disconnection from the outside, and means preventing the introduction of liquid to the recipient through the outlet of the faucet.

2. A device for guaranteeing the genuineness of a drink contained in a receptacle comprising a casing with a chamber for receiving the discharge end of the receptacle, a flange on said discharge end and a collar engaging said flange adapted to lock said end within the chamber, a door closing said chamber with an exterior lock therefor and means for discharging the contents of the receptacle through an outlet located outside the casing and connected to the discharge end of the receptacle by a shank, a securing device within said chamber for said shank, said outlet being provided with means preventing the introduction of liquid therethrough.

3. A device according to claim 2 in which said discharging means includes a cap inserted between said discharge end of the receptacle and said shank.

4. A device according to claim 2 in which said discharging means includes a cap inserted between said discharge end of the receptacle and said shank, said cap having threaded connection with said shank and said discharge end of the receptacle respectively and being provided with a conduit forming connection between said receptacle and shank, and a breathing pipe in said cap.

MANUEL CABRERA y GARCIA.